United States Patent
Bley et al.

(10) Patent No.: US 6,285,192 B1
(45) Date of Patent: Sep. 4, 2001

(54) PENNING VACUUM METER

(75) Inventors: Werner Grosse Bley, Bonn; Gerhard Kuster, Köln, both of (DE)

(73) Assignee: Leybold Vakuum GmbH (DE)

( * ) Notice: Subject to any disclaimer, the term of this patent is extended or adjusted under 35 U.S.C. 154(b) by 0 days.

(21) Appl. No.: 09/403,193

(22) PCT Filed: Feb. 27, 1998

(86) PCT No.: PCT/EP98/01111

§ 371 Date: Oct. 14, 1999

§ 102(e) Date: Oct. 14, 1999

(87) PCT Pub. No.: WO98/48445

PCT Pub. Date: Oct. 29, 1998

(30) Foreign Application Priority Data

Apr. 24, 1997 (DE) ............................................. 197 17 263

(51) Int. Cl.[7] ........................... G01L 21/30; G01L 21/34; G01N 27/62; H01J 1/48

(52) U.S. Cl. .......................... 324/460; 324/463; 324/466; 313/311

(58) Field of Search .................................... 324/460, 466, 324/463; 313/311, 309, 336, 356, 326

(56) References Cited

U.S. PATENT DOCUMENTS 4,047,102 * 9/1977 Welch .................................. 324/466
5,157,333 * 10/1992 Peacock et al. ...................... 324/463
5,317,270 * 5/1994 Lethbridge ........................... 324/460

FOREIGN PATENT DOCUMENTS

| 300358 | 4/1951 | (CH) . |
| 448559 | 2/1967 | (CH) . |
| 893416 | 7/1949 | (DE) . |
| 2056155 | 11/1970 | (DE) . |
| 3712874A1 | 4/1987 | (DE) . |
| 3712874 | 5/1988 | (DE) . |
| 19528314A1 | 8/1995 | (DE) . |
| 19528314 | 2/1997 | (DE) . |
| 0271769 | 12/1987 | (EP) . |
| 271769 | 6/1988 | (EP) . |
| 0516422A2 | 5/1992 | (EP) . |
| 516422 | 12/1992 | (EP) . |
| 1498715 | 10/1975 | (GB) . |

* cited by examiner

Primary Examiner—Safet Metjahic
Assistant Examiner—Anjan K Deb
(74) Attorney, Agent, or Firm—Wall, Marjama & Bilinski

(57) ABSTRACT

The invention relates to a Penning vacuum meter (1), comprising a cathode and an anode. According to the invention, the cathode (11) consists at least mainly of titanium in order to avoid the detrimental effects of the cathode disintegrating.

6 Claims, 1 Drawing Sheet

PENNING VACUUM METER

BACKGROUND OF THE INVENTION

The present invention relates to a Penning vacuum meter comprising a cathode and an anode.

A Penning vacuum meter is a cold cathode vacuum meter, the operation of which is based on a cold discharge. It comprises a tube with two non-heated electrodes, cathode and anode, between which a discharge is ignited and maintained by means of a DC voltage (about 2 kV during operation), whereby said discharge is maintained in a steady state also at very low pressures. This is attained by making the path for the electrons so long with the aid of a magnetic field, that their collision rate with the gas molecules is sufficiently high in order to form the required quantity of charge carriers to maintain the discharge.

In the tubes of Penning vacuum meters, the cathode material is disintegrated by the ions which are accelerated in the direction of the cathode, particularly so in connection with coating processes involving heavy noble gases (argon, xenon) being performed in the pressure range between $10^{-4}$ and $10^{-2}$ mbar. The disintegrated cathode material forms on the walls of the measurement tube a conductive layer.

Generally, stainless steel is employed as the material for the cathode. Owing to the cathode disintegration process described ("sputtering") the service life of the cathode is limited. Moreover, disintegrated stainless steel cathode material is magnetic. Parts coming loose from the formed layers are capable of aligning themselves in the magnetic field thereby causing short circuits. In addition, parts of the measuring cell, which actually should be electrically isolating (ceramic feedthroughs) may become electrically conducting. These disadvantages result in an unstable readout or extinguishing of the discharge and thus in a failure of the measurement tube. Even so, the Penning vacuum meter is employed very often, since it is cost-effective and insensitive to air inrushes and vibrations.

SUMMARY OF THE INVENTION

It is the task of the present invention to substantially remove the detrimental effects which occur owing to the disintegration effect described.

This task is solved by employing titanium as the material for the cathode. Owing to the lower sputtering yield, sputtering of the cathode material is only slight when using titanium. Thus the service life of the cathode is improved and coating with conductive metal is reduced. The sputter products are non-magnetic so that they may no longer cause the described short circuits in the magnetic field. Therefore, Penning vacuum meters with titanium cathodes will provide a stable readout over a long time even in coating processes. Surprisingly, the ignition characteristic is also improved.

BRIEF DESCRIPTION OF THE DRAWINGS

Further advantages and details of the present invention shall be explained on the basis of the design example presented in the drawing figures.

DESCRIPTION OF THE INVENTION

Figure 1:
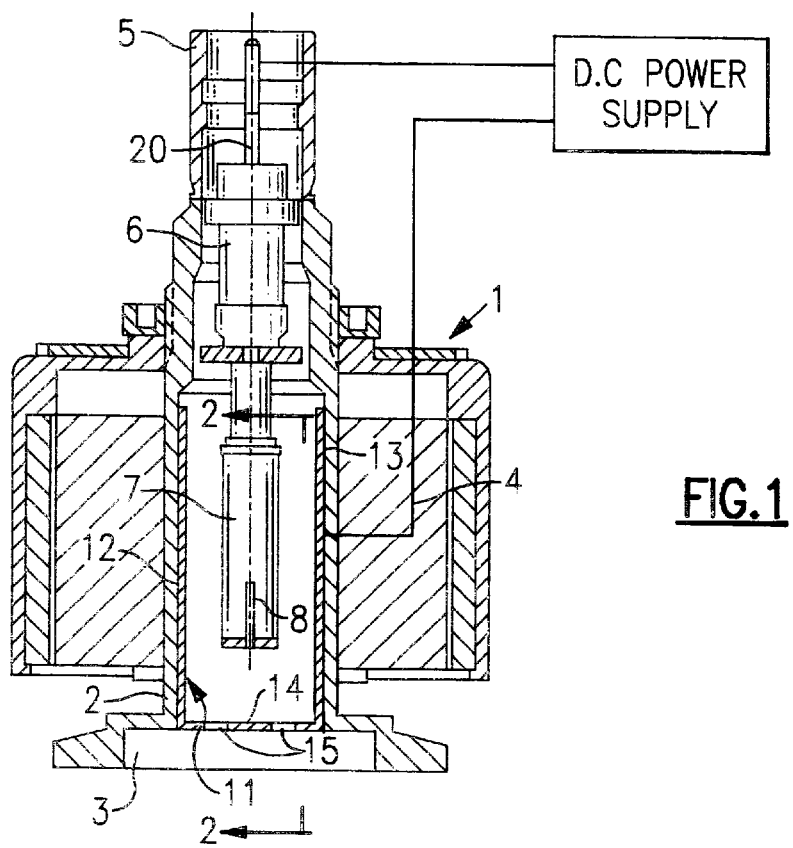
FIG. 1 is a side elevation in section of a Penning vacuum meter embodying the teachings of the present invention.

The depicted Penning vacuum meter 1 comprises housing 2 with flange 3 for connecting the housing to a vacuum chamber or the like (not shown), and the magnet 4 arranged outside of the housing. The current feedthrough 6 extending from the connecting socket 5 into the inside of the housing 2 carries a ring or annular shaped anode 7 with ignition pin 8.

The cathode 11 is an U-shaped panel, the arms 12, 13 of which are rectangular shaped and embrace the anode 7. The arms extend substantially in parallel to the plane of the anode ring 7. Cathode 11 consists mostly of titanium.

The cathode panel 11 is fitted to the housing 2 using a tight fit. The base plate of the cathode 14 which joins the arms 12, 13 is located in the area of the opening of the flange 3. The base plate is equipped with cut-outs 15 in order to ensure a sufficiently high conductance for the in process gases.

Figure 2:
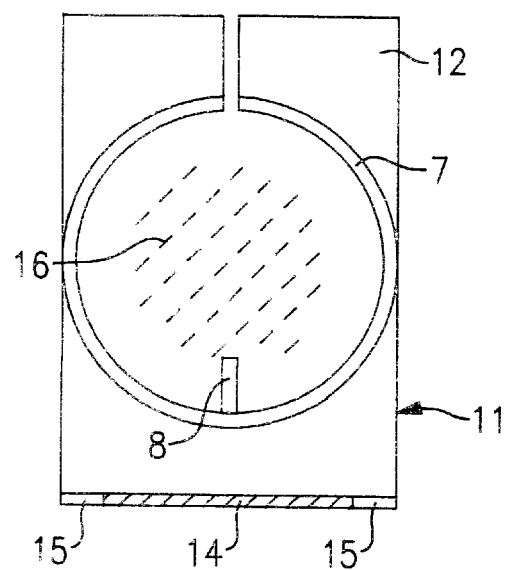
FIG. 2 is a view of the V-shaped cathode panel shown in FIG. 1 taken along lines 2—2. Cathode 11 consists mostly of titanium.

Depicted in drawing FIG. 2 is a front view of the anode looking at the inside of arm 12 of the U-shaped cathode panel 11. As shown in FIG. 2, the outside diameter of the anode is about equal to the width of each arm and less than the length of each arm. The anode lies in a plane that is coaxial with the central axis 20 of the cathode housing. The dashed lines 16 indicate that the inner surface area of arms 12 and 13 facing the opening of the anode ring 7 have been roughened by sand blasting, for example. The ignition characteristic is improved by these roughened surfaces, since the points created promote field emissions by the electrons.

A d.c. power supply 21 is provided to apply about 2 kV between the cathode and the anode when the meter is operating.

What is claimed is:

1. A penning vacuum meter that includes:
    a cathode housing having a flange at one end for connecting the housing to a vacuum chamber and an opening passing axially through said housing;
    a U-shaped cathode, mounted in said housing, said cathode having two opposed rectangular shaped arms connected by a flat base plate, said arms being parallel to the axis of said housing and being tightly fitted against opposed inner walls of said opening with the base plate of the cathode passing across the opening at the flange;
    an annular shaped anode suspended within said opening between the arms of said cathode, said anode lying in a plane that is parallel with said arms, the diameter of the anode being substantially equal to the width of said arms; and
    said cathode being formed of a material that will resist disintegration when bombarded by accelerated ions when operating within a pressure range of between $10^{-4}$ and $10^{-2}$ mbars.

2. The Penning vacuum meter of claim 1 wherein the opposing surfaces of the cathode arms are roughened to produce points for promoting the field emission of electrons.

3. The Penning vacuum meter of claim 1 wherein the base of the cathode contains a plurality of cutouts passing therethrough to ensure high conductance for process gases.

4. The Penning vacuum meter of claim 1 that includes a d.c. power supply for applying about 2 kV between the cathode and the anode.

5. The Penning vacuum meter of claim 1 that further includes a magnet surrounding the housing about said cathode for extending the electron path within said housing.

6. The Penning vacuum meter of claim 1 wherein said cathode is fabricated of a non-magnetic material.

\* \* \* \* \*